B. C. SILVER.
CRADLE.
APPLICATION FILED JUNE 25, 1919.
1,368,849.
Patented Feb. 15, 1921.
4 SHEETS—SHEET 3.
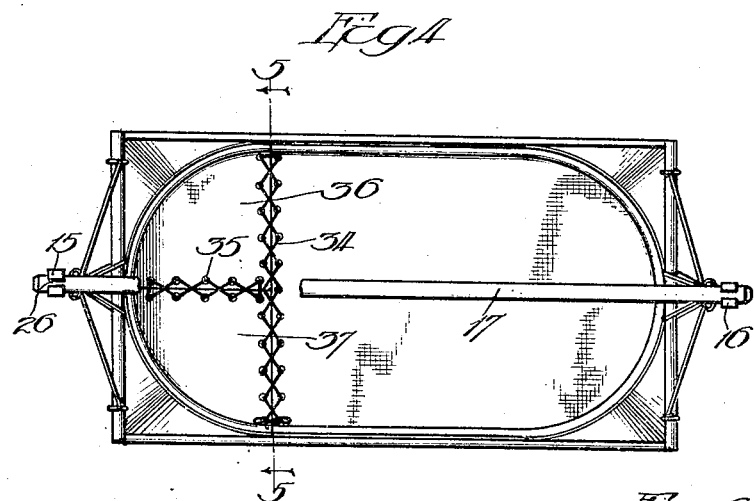
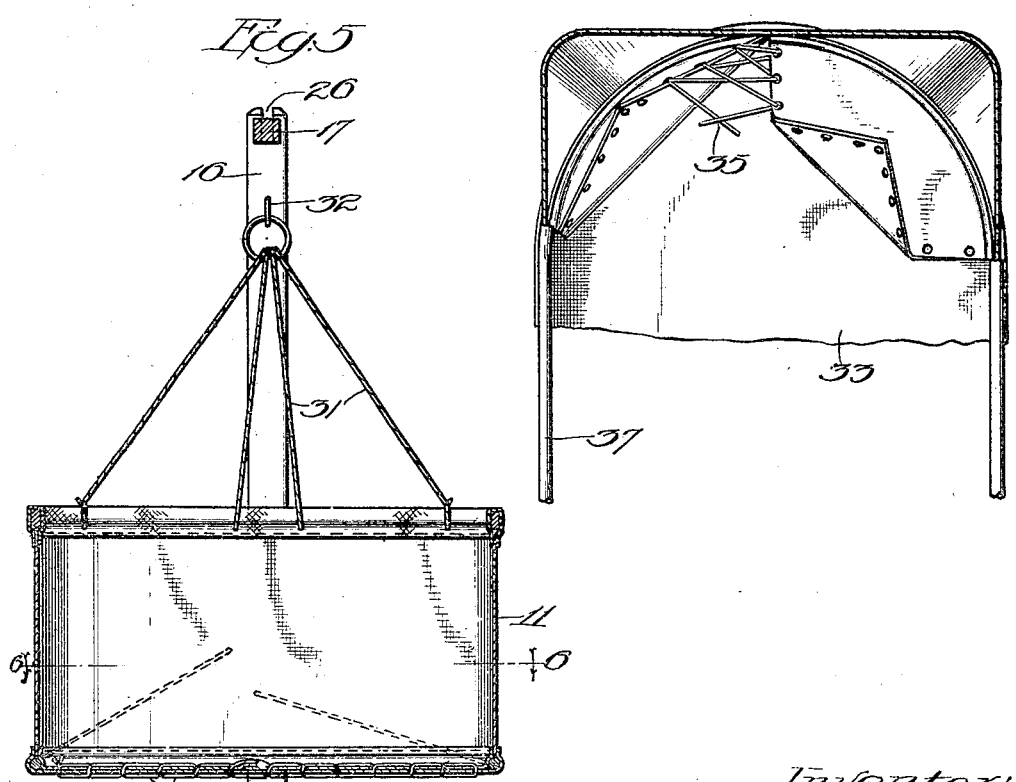

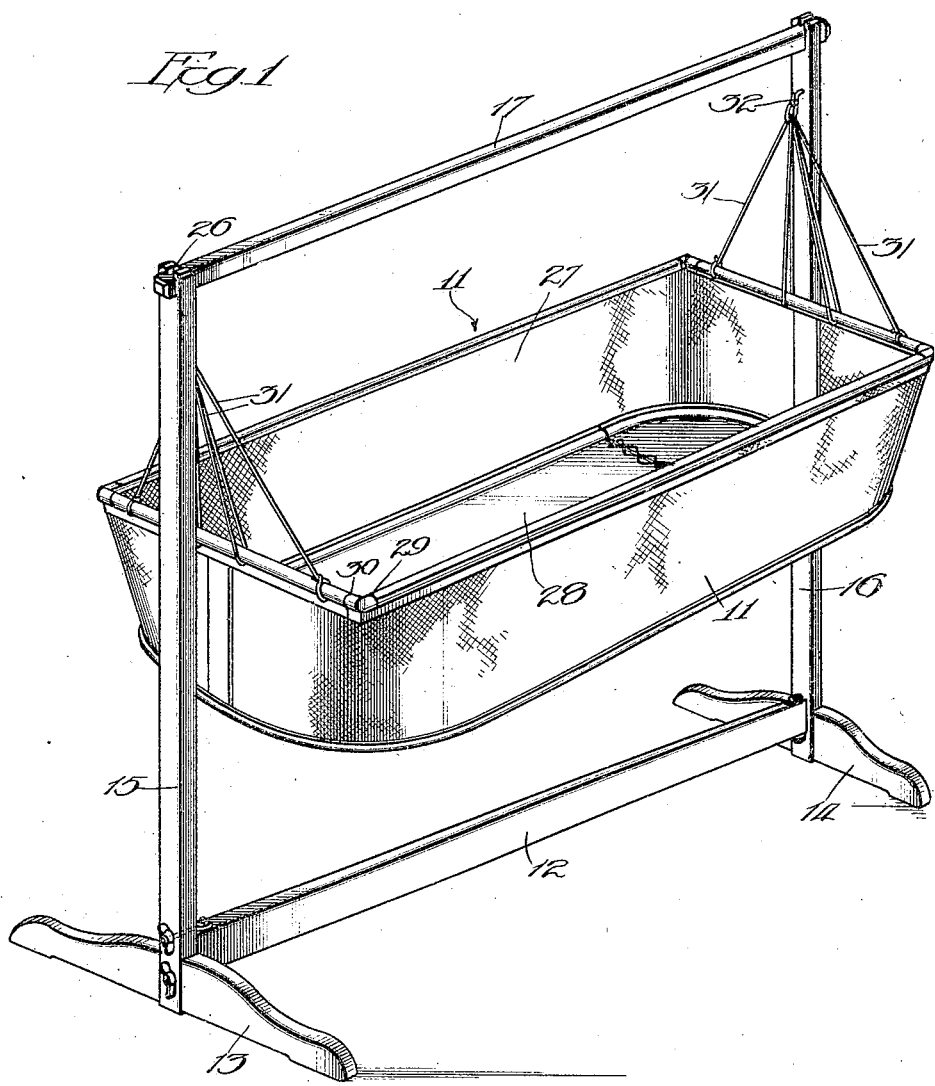

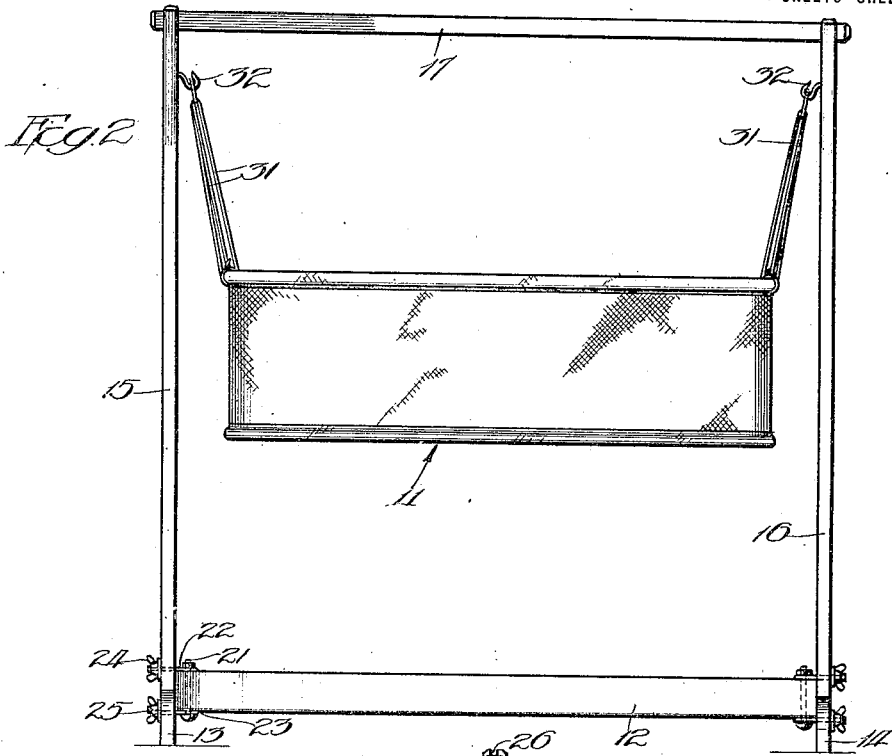
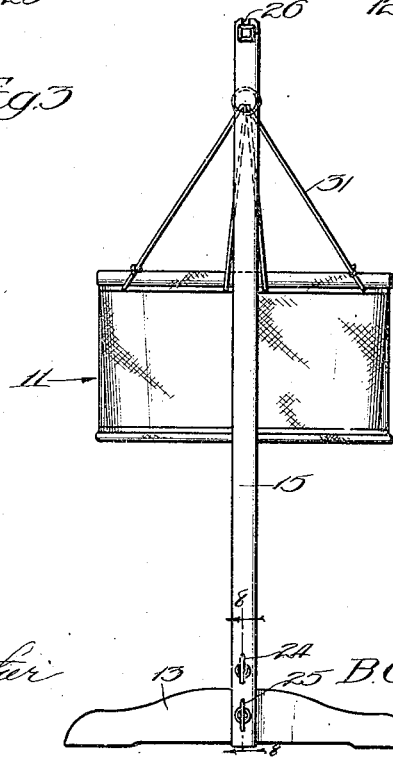

B. C. SILVER.
CRADLE.
APPLICATION FILED JUNE 25, 1919.
1,368,849.
Patented Feb. 15, 1921.
4 SHEETS—SHEET 4.
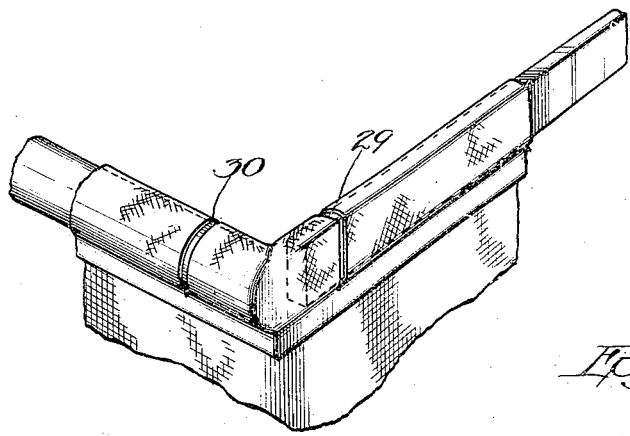
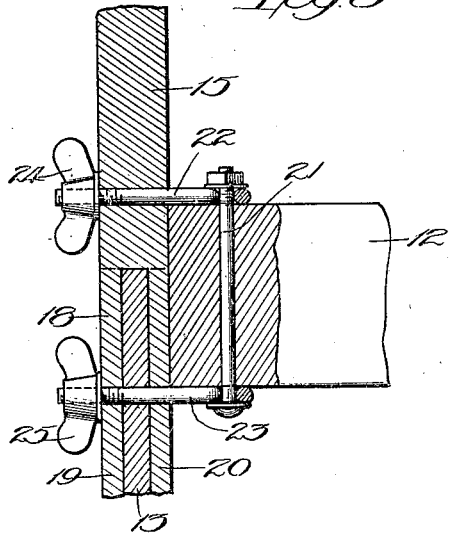
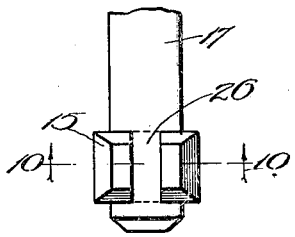
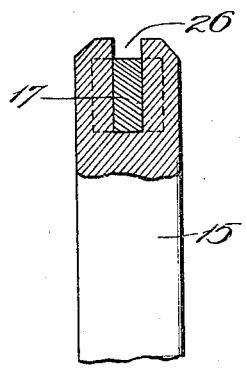
Witness:
Harry S. Gaither
Inventor
B. Coleman Silver

UNITED STATES PATENT OFFICE.

BENNETT COLEMAN SILVER, OF CHICAGO, ILLINOIS.

CRADLE.

1,368,849.

Specification of Letters Patent.

Patented Feb. 15, 1921.

Application filed June 25, 1919. Serial No. 306,543.

*To all whom it may concern:*

Be it known that I, BENNETT COLEMAN SILVER, a citizen of the United States, residing at Chicago, in the county of Cook and State of Illinois, have invented certain new and useful Improvements in Cradles, of which the following is a specification.

The present invention has to do with certain improvements in cradles and has particular reference to improvements in swinging cradles, although certain of the features of the invention are not limited to use in swinging cradles.

One of the features of the invention has to do with the provision of an improved form and construction of frame for suspending the cradle, said frame being so constructed that it can be readily taken apart for shipment or transported in a very small bulk, or so that it can be stored away in a minimum amount of space. Another feature of the invention has to do with the provision of a sanitary cradle which is so constructed that it may be washed or otherwise cleaned in a very easy and thorough manner. In this connection, I will state that when the basket portion of the cradle is in use, it is provided with a stiff frame by which it may be suspended, but it is so formed that said frame can be easily removed leaving only the fabric or cloth portion of the cradle which, in turn, can be easily laundried or cleaned.

Other objects of the invention may be stated to be the provision of a cradle and frame of very pleasing appearance; and one which can be cheaply manufactured from a minimum number of simple but strong and durable parts.

Other objects and uses of the invention will appear from a detailed description of the same which consists in the features of construction and combination of parts hereinafter described and claimed.

In the drawings:

Figure 1 shows a perspective view of an assembled cradle embodying the features of the present invention;

Fig. 2 shows a side view corresponding to Fig. 1;

Fig. 3 shows an end view corresponding to Fig. 1;

Fig. 4 shows a plan view corresponding to Figs. 1, 2, and 3;

Fig. 5 shows a detail cross section on enlarged scale taken on the line 5—5 of Fig. 4, looking in the direction of the arrows;

Fig. 6 shows an enlarged detail fragmentary plan view taken on the line 6—6 of Fig. 5, looking in the direction of the arrows;

Fig. 7 shows a fragmentary perspective view of one of the upper corners of the basket and its frame;

Fig. 8 shows an enlarged detail section taken on line 8—8 of Fig. 3, looking in the direction of the arrows;

Fig. 9 shows an enlarged fragmentary detail plan view of one of the upper ends of the supporting frame; and Fig. 10 is a section taken on the line 10—10 of Fig. 9, looking in the direction of the arrows.

Referring now to the drawings the cradle in its entirety is designated by the numeral 11. It is supported from a frame or stand which is self-contained, and is independent of other objects of furniture. Said frame includes a bottom rail 12, pedestals 13 and 14, uprights 15 and 16, and a top rail 17. Each of the uprights 15 and 16 has its lower end slotted, as shown at 18 in Fig. 8, so that the bifurcations 19 and 20 on its lower end may engage the side grooved or slotted portions of the corresponding pedestal 13 or 14 as the case may be. Each end of the bottom rail 12 is provided with a vertical pin 21 whose upper and lower ends pass through the eyes of eye-bolts 22 and 23, respectively. These eye-bolts, in turn, extend through holes in the lower ends of the uprights 15 and 16, and may be clamped thereto by the wing nuts 24 and 25, or in any other suitable manner. As a convenient form of construction the lower eye-bolt 23 in each case passes through the corresponding pedestal 13 or 14 as well as the bifurcations 19 and 20 of the upright, so as to lock the pedestal to the upright. The upper end of each upright is slotted as at 26 to receive the corresponding slotted end portion of the top rail 17. From the foregoing it will be observed that the frame or stand comprises only six pieces which may be fastened together and securely held in rigid manner by the use of four wing nuts on their respective eye-bolts.

The cradle or basket comprises a general cylindrical member 27 and a bottom member 28, as well as the necessary supporting frame bars. The cylindrical side wall member 27 is conveniently made from netting or other sanitary and open material so as to facilitate the ventilation of the interior of the cradle when in use. The bottom 28 may be made from canvas or any other fabric, but ordinarily will be of stronger and more durable material than the cylindrical side portion 28.

The upper edges of the side portion are preferably looped over or hemmed, as is clearly shown in Figs. 5 and 7 in particular. The end portions of this hem are slitted, as shown, for example, at 29 and 30, so that reinforcing or stiffening bars may be slid through said slits and into the hems thereof so as to reinforce the upper portion of the cradle or basket, and insure a certain degree of rigidity. Nevertheless these reinforcing bars can be readily removed without difficulty and without the necessity of cutting any portion of the article. The cradle or basket is conveniently supported by suspension by means of the cords 31 from hooks 32 on the inner faces of the upper portions of the uprights 15 and 16.

The bottom 28 is conveniently made in two thicknesses of material, as will be readily apparent from an examination of Figs. 4, 5, and 6. The lower thickness 33 is continuous, whereas the upper thickness is preferably slitted crosswise on the line 34 and lengthwise on the line 35 so as to provide a pair of flaps 36 and 37 respectively. These flaps can be readily turned back upon occasion, as shown in Fig. 6. A wire reinforcing rod 37 of the proper contour and size may be slipped in between the two thicknesses of fabric constituting the bottom of the cradle or basket so as to support and reinforce the edge thereof and give the same the proper configuration, as will be evident from an examination of Figs. 1 and 6 in particular. This wire reinforcing frame may be readily interposed and removed by turning back the flaps 36 and 37 and without the necessity of cutting or otherwise permanently injuring or disarranging the cradle or basket itself. Any suitable means may be provided for holding the flaps 36 and 37 in their usual or working position, as, for example, lacings passed through perforations or eyelets in the edge portions of the flaps 36 and 37 and the main portion of the bottom 28 itself.

From the disclosure as above explained, it will be evident that I have provided an arrangement or construction of cradle by means of which the basket may be readily removed and all reinforcing rods or bars removed from it, so as to enable it to be readily laundried or cleaned in a washing machine or in any other desired manner. At the same time the arrangement provided is such that the basket may be readily put together with a very few operations and by one unskilled and without the necessity of using special tools or mechanisms of any kind.

While I have herein shown and described only a single embodiment of the features of my invention, still I do not limit myself to the said embodiment, except as I may do so in the claims.

I claim:

1. In an article of the class described, a supporting frame having a pair of vertical end posts, the lower portion of each of said posts being transversely slotted, a pedestal extending through the slot of each post, and at right angles to the post a bottom rail joining together the lower ends of the posts and pedestals, bolts on the end portions of said rail extending through the slotted end portions of the corresponding vertical posts and through the corresponding pedestals, and serving to secure the pedestal of each post to its post and to the end of the rail wing nuts on said bolts, and a suitable connection between the upper ends of the posts, substantially as described.

2. In an article of the class described, a supporting frame comprising a pair of vertical end posts, the lower portions of which have transverse slots, pedestals in said slots and at right angles to the post, a bottom rail adapted to join together the lower portions of the posts and pedestals, and bolts on the end portions of said rails extending through the slotted portions of the posts and through the pedestals and serving to secure the pedestal of each post to its post and to the end of the rail, substantially as described.

B. COLEMAN SILVER.